United States Patent [19]
Kobayashi et al.

[11] Patent Number: 6,051,969
[45] Date of Patent: Apr. 18, 2000

[54] SENSOR ROTOR MADE FROM RING PIECES HAVING OUTER AND INNER EDGES WITH IDENTICAL RADIUSES OF CURVATURE

[75] Inventors: Keizo Kobayashi; Yoshinori Sudo, both of Shizuoka, Japan

[73] Assignees: NTN Corporation, Osaka; Yamaha Metanix Corporation, Shizuoka, both of Japan

[21] Appl. No.: 09/028,326

[22] Filed: Feb. 24, 1998

[30] Foreign Application Priority Data

Feb. 26, 1997 [JP] Japan ..................................... 9-042103

[51] Int. Cl.[7] .............................. G01P 3/48; G01P 3/54; F16C 32/00
[52] U.S. Cl. ............................................ 324/174; 384/448
[58] Field of Search .............................. 324/174, 207.25, 324/207.22; 310/156; 335/306; 29/598; 384/448

[56] References Cited

U.S. PATENT DOCUMENTS 4,877,986  10/1989  Shimizu ................................. 310/156

*Primary Examiner*—Walter E. Snow
*Attorney, Agent, or Firm*—Wenderoth, Lind & Ponack, L.L.P.

[57] ABSTRACT

The present invention relates to a method of manufacturing a sensor rotor with a minimum waste of material. The sensor rotor is manufactured by forming a plurality of ring pieces having outer and inner edges that are identical in curvature to each other, arranging the ring pieces in the shape of a ring, magnetizing the ring pieces to create opposite magnetic poles alternately in the circumferential direction of the ring pieces to form a magnetized ring, and fixing the magnetized ring to the inside of a press-in ring. Since the outer edge of each ring piece substantially coincides with the inner edge of the adjacent ring piece, it is possible to eliminate the waste of material between the adjacent ring pieces.

19 Claims, 2 Drawing Sheets

6,051,969

SENSOR ROTOR MADE FROM RING PIECES HAVING OUTER AND INNER EDGES WITH IDENTICAL RADIUSES OF CURVATURE

BACKGROUND OF THE INVENTION

This invention relates to a sensor rotor that rotates with a wheel for detecting wheel speed.

Many of today's automobiles are equipped with an antilock brake system (ABS) and/or a traction control system (TCS). ABS and TCS perform brake and slip control based on wheel speeds detected by sensors.

Some of such wheel speed sensors include sensor rotors each mounted on a wheel bearing.

This type of sensor rotor comprises a magnetized ring having opposite magnetic poles alternately formed in the circumferential direction thereof, and a press-in ring having a flange. The sensor rotor is mounted to a wheel bearing by press-fitting the press-in ring into the rotating race of the bearing and fixing the magnetized ring to the inner surface of the flange of the press-in ring.

A rotation sensor is mounted on the fixed race of the wheel bearing to detect the rotating speed of the rotating race and thus that of the wheel by detecting the electromotive force induced when the magnetic poles of the rotating magnetized ring pass by the sensor.

In a conventional method of manufacturing a sensor rotor, the magnetized ring is formed by blanking a ring out of a flat plate member made of a magnetizable material, and magnetizing the ring. The portion of the flat plate inside of the ring is totally useless and is discarded as a waste.

In another conventional method, four ring pieces, which are quarter arcs of a ring, are formed by blanking a magnetic plate, the ends of the ring pieces are welded together to form a ring, and the ring is magnetized to form opposite magnetic poles alternately in the circumferential direction thereof.

Since the ring pieces have outer edges which have smaller radius or curvature curvature than their inner edges, they cannot be arranged with no space formed between the outer and inner edges of adjacent ring pieces. Thus, when such ring pieces are blanked out of a flat plate material, marginal portions inevitably remain between the outer and inner edges of the adjacent ring pieces. Such marginal portions of the flat plate material are useless and thus have to be discarded as waste.

Thus, in either of the above conventional methods, material loss is inevitable.

An object of this invention is to eliminate such material loss and thus reduce the manufacturing cost of a sensor rotor.

SUMMARY OF THE INVENTION

According to this invention, there is provided a sensor rotor for detecting wheel speed comprising a magnetized ring comprising a plurality of ring pieces having outer and inner edges that are identical in radius of curvature to each other and are arranged in the shape of a ring, the magnetized ring being made by magnetizing such that opposite magnetic poles are formed alternately in the circumferential direction thereof, and a press-in ring to the inside of which the magnetized ring is fixed.

The present invention also provides a method of manufacturing a sensor rotor comprising blanking a magnetic plate to form a plurality of ring pieces having outer and inner edges that are identical in radius of curvature to each other so that the outer edge of each of the ring pieces substantially coincides with the inner edge of the adjacent ring piece, arranging the ring pieces in the shape of a ring, magnetizing the ring pieces creating opposite magnetic poles alternately in the circumferential direction of the ring to form a magnetized ring, and fixing the magnetized ring to the inside of a press-in ring.

In the method according to this invention, the ring pieces to be formed into the magnetized ring have outer and inner edges that are equal in curvature to each other. Thus, it is possible to blank such ring pieces out of a flat plate material so that the outer and inner edges of the adjacent ring pieces substantially coincide with each other. With this arrangement, it is possible to eliminate the waste of material between the adjacent ring pieces.

The ring pieces may be arranged in the shape of a ring with the opposed ends of the adjacent ring pieces abutting each other or spaced from each other.

BRIEF DESCRIPTION OF THE DRAWING

Other features and objects of the present invention will become apparent from the following description made with reference to the accompanying drawings, in which.

DETAILED DESCRIPTION OF THE PREFERRED EMBODIMENT

Description is now made of a sensor rotor according to this invention and a method of manufacturing such a sensor with reference to the attached figures.

Figure 1A:
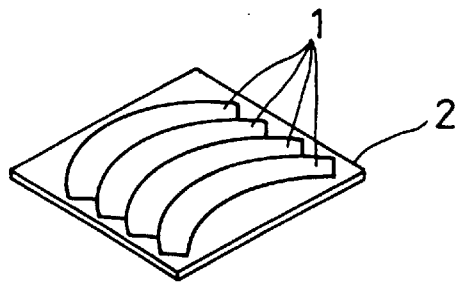
FIG. 1A–1C are perspective views showing how a sensor rotor is manufactured according to this invention.

As shown in FIG. 1A, four flat ring pieces 1 are formed one at a time or simultaneously by blanking a magnetic plate 2 so that an outer edge of each piece 1 substantially coincides with an inner edge of an adjacent piece 1.

Figure 1B:
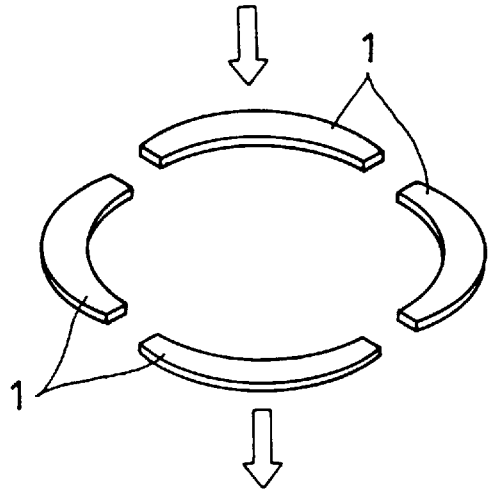
Figure 1C:
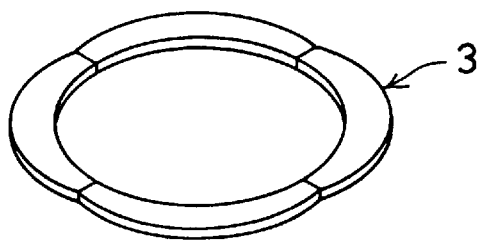

The ring pieces 1 are arranged in the shape of a ring as shown in FIG. 1B, and their ends are welded or otherwise joined together. By magnetizing this ring to create N and S poles alternately in a circumferencial direction on the front and back thereof, a magnetized ring 3 shown in FIG. 1C is formed.

Figure 2:
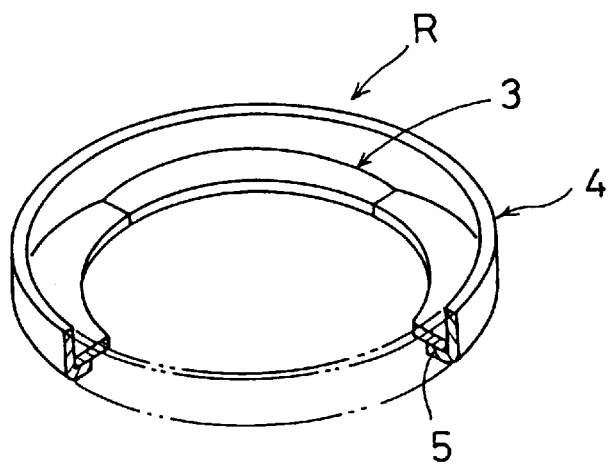
FIG. 2 is a perspective view of the sensor rotor as fixed to a press-in ring.

As shown in FIG. 2, the thus magnetized ring 3 is welded or otherwise fixed to an inner side of an inwardly bent flange 5 of a press-in ring 4. A sensor rotor R is thus formed. In this embodiment, the magnetized ring 3 is formed by joining the ring pieces 1 end to end. However, the ring pieces 1 instead may be magnetized before joining them together and the magnetized ring can be fixed to the press-in ring 4 as it is.

Figure 3:
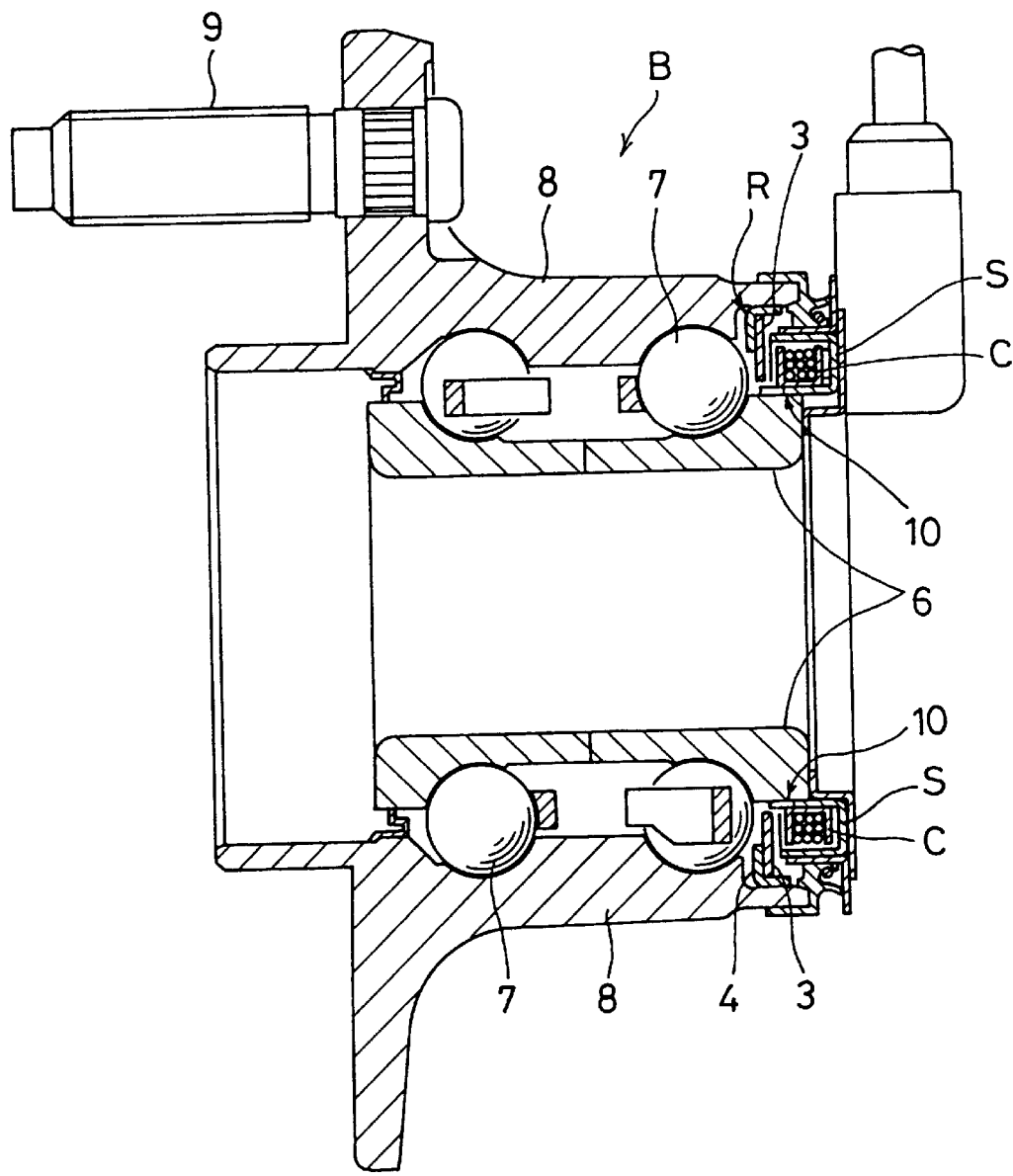
FIG. 3 is a sectional view of the sensor rotor in use.

The sensor rotor R is mounted on a wheel bearing B as shown in FIG. 3 to detect wheel speed.

The wheel bearing B comprises an inner ring 6 supporting a wheel axle, and an outer ring 8 rotatably mounted around the inner ring 6 through rolling elements 7. In this embodiment, the inner ring 6 is a fixed race, while the outer ring 8 is a rotating race. The press-in ring 4 of a rotor R is press-fitted in the outer ring 8, which is fixed to the wheel by bolts 9. Thus, the sensor rotor R rotates at the same speed as the wheel.

A rotation detection sensor 10 is mounted on the inner ring 6, opposite the magnetized ring 3 of the sensor rotor R. The rotation detection sensor 10 comprises an annular stator S having a ⊐-shaped section, and a coil C wound around the stator S. The stator S is joined to the outer periphery of the inner ring 6 and under the effect of a magnetic field from the magnetized ring 3 of the sensor rotor R.

When the outer ring 8 of the wheel bearing B rotates together with the wheel, the sensor rotor R rotates together with the outer ring 8, so that the magnetic field produced by the magnetic poles of the magnetized ring 3 also rotates. Thus, the N and S poles pass by inner and outer teeth of the stator S. This induces alternating fields in the stator S and thus induces an electromotive force proportional to the rotating speed of the sensor rotor R. The electromotive force is taken out through a lead and a harness, and converted to a pulse signal. Based on the pulse signal, the rotating speed of the wheel is detected.

In the above-described method of manufacturing the sensor rotor R, a plurality of ring pieces 1 are formed one at a time or simultaneously so that the outer edge of each piece substantially coincides with the inner edge of the adjacent piece. Thus, there exists substantially no material loss between the outer and inner edges of the adjacent ring pieces 1. This significantly reduces material loss, because most material loss is due to such marginal portions present around the respective ring pieces 1.

The sensor rotor R formed from such ring pieces does not have a precisely round outer edge. But this will have little or no influence on the wheel speed detecting function, because N and S poles are formed alternately by magnetization along its inner edge. Ordinarily, the ring pieces 1 are made from an Fe—Cr—Co alloy.

In this embodiment, the magnetized ring is fixed to the rotating race through the press-in ring. However, it may be instead directly fixed to the rotating race.

According to the method of the present invention, a magnetized ring can be manufactured with a minimum waste of material, and thus the sensor rotor can be manufactured at a low cost. This method is environmentally desirable, because the material loss is minimal. By mounting such a sensor rotor in a wheel bearing assembly, the entire assembly can be manufactured at a low cost.

What is claimed is:

1. A sensor rotor for detecting wheel speed, comprising:
   a press-in ring;
   a magnetized ring fixed to said press-in ring;
   wherein said magnetized ring comprises a plurality of ring pieces joined together in a ring shape and being magnetized, respectively, so as to have opposite magnetic poles formed alternately in a circumferential direction of said magnetized ring; and
   wherein each of said plurality of ring pieces has outer and inner edges that have identical radiuses of curvature.

2. A sensor rotor according to claim 1, wherein said press-in ring includes an inwardly bent flange and said magnetized ring is fixed to said inwardly bent flange.

3. A sensor rotor according to claim 1, wherein said magnetized ring is fixed to said inwardly bent flange by a weld.

4. A sensor rotor according to claim 1, wherein said magnetized ring is fixed to said press-in ring by a weld.

5. A sensor rotor according to claim 1, wherein said plurality of ring pieces are made from an Fe—Cr—Co alloy.

6. A wheel bearing comprising:
   a fixed race;
   a rotating race provided in a rotational relationship with said fixed race;
   a sensor rotor fixed to said rotating race;
   wherein said sensor rotor comprises
      a press-in ring,
      a magnetized ring fixed to said press-in ring,
      wherein said magnetized ring comprises a plurality of ring pieces joined together in a ring shape and being magnetized, respectively, so as to have opposite magnetic poles formed alternately in a circumferential direction of said magnetized ring, and
      wherein each of said plurality of ring pieces has outer and inner edges that have identical radiuses of curvature; and a rotation detection sensor fixed to said fixed race to receive a magnetic field from said sensor rotor.

7. A wheel bearing according to claim 6, wherein said fixed race includes an inner ring and said rotating race includes an outer ring rotatably mounted around said inner ring.

8. A wheel bearing according to claim 6, wherein said fixed race includes an outer ring and said rotating race includes an inner ring rotatably mounted inside said outer ring.

9. A wheel bearing according to claim 6, wherein said press-in ring includes an inwardly bent flange and said magnetized ring is fixed to said inwardly bent flange.

10. A wheel bearing according to claim 9, wherein said magnetized ring is fixed to said inwardly bent flange by a weld.

11. A wheel bearing according to claim 6, wherein said magnetized ring is fixed to said press-in ring by a weld.

12. A wheel bearing according to claim 6, wherein said plurality of ring pieces are made from an Fe—Cr—Co alloy.

13. A wheel bearing according to claim 6, wherein said rotation detection sensor includes a stator fixed to said fixed race and a coil wound around said stator.

14. A wheel bearing comprising:
   a fixed race;
   a rotating race provided in a rotational relationship with said fixed race;
   a sensor rotor fixed to said rotating race;
   wherein said sensor rotor comprises
      a magnetized ring fixed to said rotating race,
      wherein said magnetized ring comprises a plurality of ring pieces joined together in a ring shape and being magnetized, respectively, so as to have opposite magnetic poles formed alternately in a circumferential direction of said magnetized ring, and
      wherein each of said plurality of ring pieces has outer and inner edges that have identical radiuses of curvature; and
   a rotation detection sensor fixed to said fixed race to receive a magnetic field from said sensor rotor.

15. A wheel bearing according to claim 14, wherein said fixed race includes an inner ring and said rotating race includes an outer ring rotatably mounted around said inner ring.

16. A wheel bearing according to claim 14, wherein said fixed race includes an outer ring and said rotating race includes an inner ring rotatably mounted inside said outer ring.

17. A wheel bearing according to claim 14, wherein said magnetized ring is fixed to said rotating race by a weld.

18. A wheel bearing according to claim 14, wherein said plurality of ring pieces are made from an Fe—Cr—Co alloy.

19. A wheel bearing according to claim 14, wherein said rotation detection sensor includes a stator fixed to said fixed race and a coil wound around said stator.

* * * * *